(12) United States Patent
Zellers et al.

(10) Patent No.: US 6,435,856 B1
(45) Date of Patent: Aug. 20, 2002

(54) BLOW MOLDING APPARATUS WITH FIXEDLY POSITIONED PIN AND RECIPROCATING SLEEVE

(75) Inventors: Dale A. Zellers; Jimmie L. Dean; Thomas O. Morton; Matthew P. Clark; Don L. Peters, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/404,885

(22) Filed: Sep. 24, 1999

(51) Int. Cl.$^7$ ................................. B29C 49/30
(52) U.S. Cl. ................. 425/525; 264/531; 264/534
(58) Field of Search ........................ 425/554, 556, 425/577, 522, 525, DIG. 58; 264/531, 534

(56) References Cited

U.S. PATENT DOCUMENTS

| | | | |
|---|---|---|---|
| 3,742,995 A | * 7/1973 | Confer et al. | 220/660 |
| 4,136,146 A | 1/1979 | Ninneman | 264/237 |
| 4,390,338 A | 6/1983 | Bowers et al. | 425/525 |
| 4,394,116 A | 7/1983 | Kuenzig et al. | 425/192 R |
| 4,518,558 A | 5/1985 | Anway et al. | 264/515 |
| 4,981,634 A | * 1/1991 | Maus et al. | 264/102 |
| 5,454,708 A | * 10/1995 | Boenig et al. | 425/537 |
| 5,469,612 A | * 11/1995 | Collette et al. | 29/453 |

FOREIGN PATENT DOCUMENTS

WO    WO 90/10532    * 9/1990

* cited by examiner

*Primary Examiner*—Tim Heitbrink
*Assistant Examiner*—Emmanuel Luk
(74) *Attorney, Agent, or Firm*—McDermott, Will & Emery

(57) ABSTRACT

The invention relates to blow molding of an article having an inwardly projecting hollow boss with a closed end. A portion of a molten parison conforms to the shape of a fixed pin projecting from the face of a mold part to thereby form the hollow boss. The invention includes an apparatus comprising a reciprocable sleeve slidably received within the mold part over the pin. It has been found that by blow molding the parison with the sleeve initially extended with its end substantially flush with the end of the pin, followed by retracting the sleeve to a retracted position after a predetermined delay time, a boss with a thicker end results. Consequently, the boss end has greater structural integrity, and thus minimizes or eliminates the possibility of penetration and/or cracking of the boss end when a screw is threadedly received in the hollow boss.

10 Claims, 2 Drawing Sheets

BLOW MOLDING APPARATUS WITH FIXEDLY POSITIONED PIN AND RECIPROCATING SLEEVE

BACKGROUND OF THE INVENTION

The invention relates to blow molding a parison so as to form a portion thereof around a fixed pin.

In blow molding plastic articles, such as water tanks, it is sometimes necessary to form an inwardly extending, hollow boss for receiving a fastener, most typically a screw. For example, such a boss in a water tank can receive a screw therein for mounting to a wall bracket. The boss is conventionally formed by using a pin fixed to a mold part and extending from its mold face. In blow molding a parison, a portion of the parison forms around the pin to produce the desired hollow boss with a closed end. Considerable thinning of the parison wall at the boss end usually occurs during blow molding. As a result of the undesirably thin boss end, a screw as threadedly received in the hollow boss can sometimes penetrate and/or crack the boss end. This leads to leakage of water from the water tank.

SUMMARY OF THE INVENTION

It is, therefore, an object of the invention to provide a blow molding process and apparatus for use therein, which can produce a hollow boss with a thicker end to thereby assist in preventing penetration and/or cracking by a screw received in the boss.

The above object is realized with regard to an apparatus comprising: a mold part having a mold face and an opening extending through the mold part which is hereafter denoted as a mold opening, the mold opening having an end at the mold face; a sleeve having an end and slidably received in the mold opening; a pin having an end and extending through the sleeve, which thereby fits over and around the pin; a means for fixedly positioning the pin relative to the mold part so that the pin extends beyond the mold opening end with the pin end spaced therefrom outside of the mold opening; and a reciprocation means for selectively reciprocating the sleeve between an extended position and a retracted position, where in the extended position the sleeve end is substantially flush with the pin end and in the retracted position the pin extends beyond the sleeve end with the pin end spaced therefrom outside of the sleeve. The reciprocation means preferably employs application of fluidic pressure to move the sleeve between its extended and retracted positions. A pneumatic reciprocation means that uses air as the fluid is particularly preferred.

A blow molding process in accordance with the invention comprises: (a) providing (i) a mold part having a mold face and a mold opening, as described above, having an end at the mold face, (ii) a sleeve having an end and slidably received in the mold opening, and (iii) a pin having an end and fixedly positioned relative to the mold part so as to extend through the sleeve and beyond the mold opening end with the pin end spaced therefrom outside of the mold opening; (b) positioning the sleeve in an extended position with the sleeve end substantially flush with the pin end; (c) initiating blow molding of a molten parison with respect to the mold face and sleeve in its extended position; and (d) retracting the sleeve to a retracted position, in which the pin extends beyond the sleeve end with the pin end spaced therefrom outside of the sleeve, at a predetermined delay time after (c), at which time the parison is still sufficiently molten to allow a portion of the parison to form around that portion of the pin extending beyond the sleeve end.

It has been found that by blow molding the parison with the sleeve initially extended, followed by retraction of the sleeve after a predetermined delay time, a boss with a desirably thicker end results. This is clearly demonstrated in a subsequently described example.

DETAILED DESCRIPTION OF THE INVENTION

Figure 1:
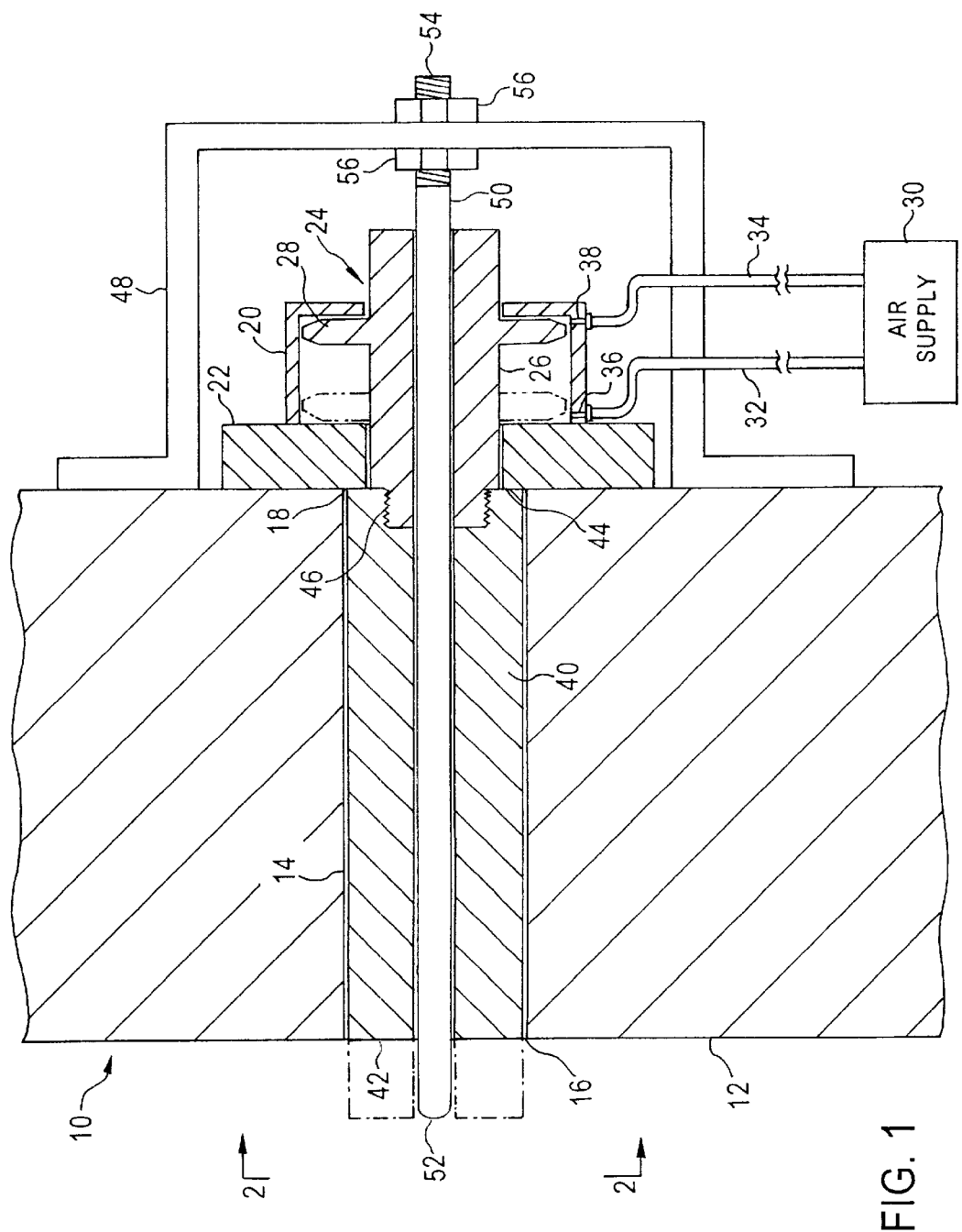
FIG. 1 is a longitudinal cross-sectional view of an embodiment of the above described apparatus.

Referring to FIG. 1, a mold part 10 has a mold face 12 and an opening 14 extending through the mold part which is hereafter denoted as the mold opening. Mold opening 14 has an end 16 at mold face 12 and an opposing end 18. A cylinder 20 is fixedly connected to mold part 10 adjacent to mold opening end 18 by means of an intermediate bushing 22, which can be secured to mold part 10 by any suitable means, such as bolts (not shown). A piston 24 includes a shaft 26 slidably received in cylinder 20 and bushing 22. Piston 24 further includes a stop ring 28, which is integral with shaft 26 and slidably received within cylinder 20. A conventional pneumatic air supply 30 has air tubes 32 and 34 extending therefrom to respective cylinder air ports 36 and 38. It should be understood and clearly apparent that cylinder 20, piston 24, and air supply 30 are illustrated in a simplified, schematic manner for clarity of illustration and ease of understanding.

As further shown in FIG. 1, a sleeve 40 has opposing ends 42 and 44, and is slidably received in mold opening 14. sleeve 40 is also fixedly but removably connected to piston shaft 26 by means of a threaded connection indicated at 46 adjacent to sleeve end 44. A pin retaining bracket 48 is fixedly connected by any suitable means, such as bolts (not shown), to mold part 10 adjacent to bushing 22 so as to fixedly retain a pin 50 in its illustrated position extending through piston shaft 26 and sleeve 40. Thus, sleeve 40 and piston shaft 26 fit over and around pin 50. Pin 50 has an end 52, which is preferably slightly rounded as shown, and an opposing end 54. A portion of pin 50 adjacent to pin end 54 is preferably threaded to receive a pair of nuts 56 thereon to fixedly but removably connect pin 50 to bracket 48. FIG. 1 further shows pin 50 as extending beyond mold opening end 16 so that pin end 52 is spaced therefrom outside of mold opening 14.

In FIG. 1, piston 24 and sleeve 40 are shown in solid lines as being in their respective retracted positions. In the retracted position, pin 50 extends beyond sleeve end 42 so that pin end 52 is spaced therefrom outside of sleeve 40. In the illustrated embodiment, and as is most typical, sleeve end 42 is substantially flush with mold face 12. To move piston 24 and sleeve 40 to their extended positions (indicated by phantom lines comprising alternating dots and dashes), with sleeve end 42 substantially flush with pin end 52, pressurized air is supplied by air supply 30 through tube 34 and port 38. Application of the resulting air pressure on the rear (right) face of piston stop ring 28 results in forward (leftward) movement of piston 24 and sleeve 40. Air is consequently exhausted from cylinder 22 through port 36, tube 32, and finally through air supply 30 in a conventional manner. Air supply 30, therefore, functions to supply air to cylinder 20 through one tube as well as receive exhaust air flowing from cylinder 20 through the other tube. The desired air pressure is maintained on the rear face of piston stop ring 28 to keep sleeve 40 in its extended position for a brief period during blow molding, which is discussed further below. To move sleeve 40 back to its retracted position, pressurized air is supplied by air supply 30 through tube 32 and port 36, and exhaust air flows through port 38 and tube 34.

Figure 2:
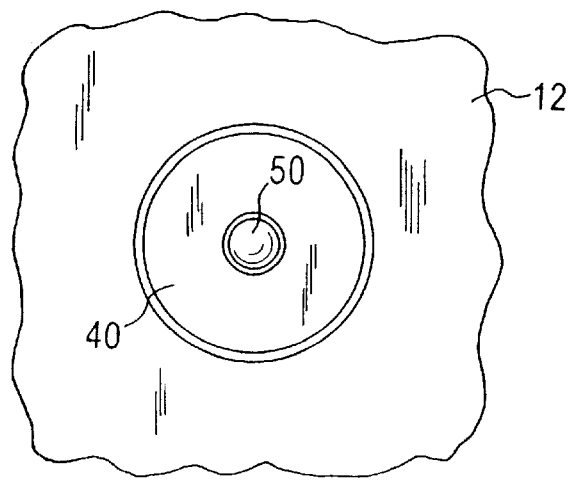
FIG. 2 is a view of the apparatus as viewed along line 2—2 in FIG. 1.

Referring to FIG. 2 in conjunction with FIG. 1, sleeve 40 and pin 50 are shown as preferably having outer surfaces which are circularly cylindrical, although other shapes are within the scope of the invention. As used herein, a "circularly cylindrical" surface defines a cylinder having a circular perimeter in any plane which intersects the cylinder so as to be perpendicular to its longitudinal axis. To optimize the desired results of a blow molding process in accordance with the invention, the ratio of the sleeve diameter to the pin diameter is about 2:1–4:1, most preferably about 2.5:1–3.5:1.

Figure 3:
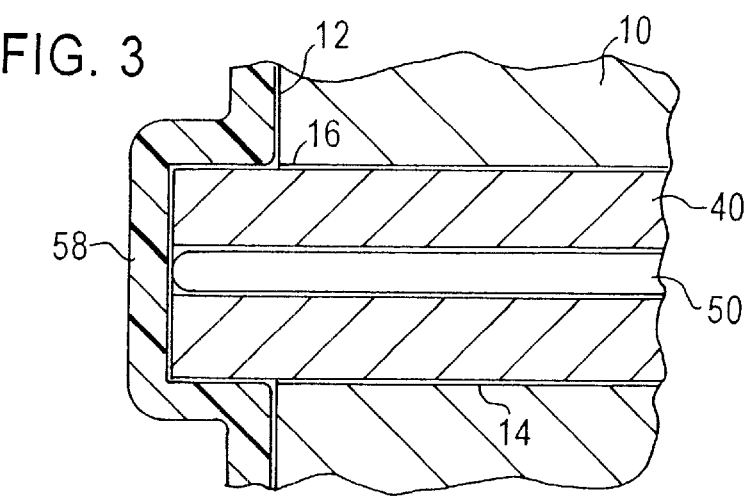
FIGS. 3 and 4 are fragmentary cross-sectional views of the apparatus illustrating blow molding of a parison with the sleeve in its extended and retracted positions, respectively.
Figure 4:
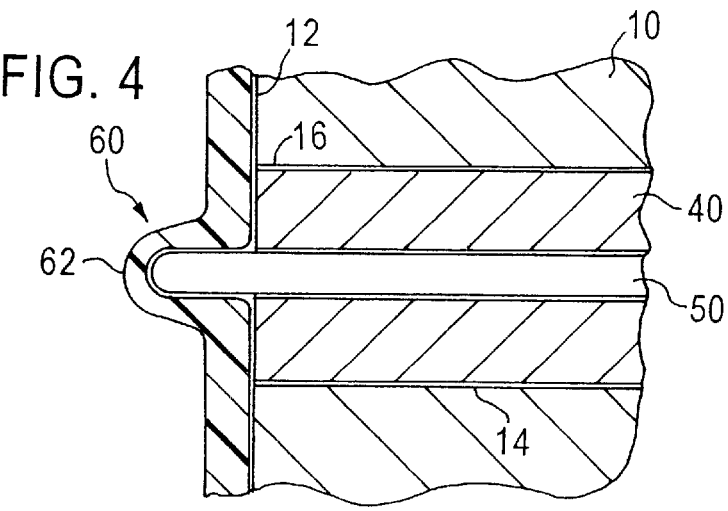

In the blow molding process of the invention, sleeve 40 is first positioned in its extended position. Blow molding of a molten plastic parison with respect to mold face 12 and sleeve 40 is then initiated. FIG. 3 shows such a parison 58 as formed around sleeve 40 in its extended position. At a predetermined delay time after initiation of blow molding, sleeve 40 is retracted to its retracted position, at which time parison 58 is still sufficiently molten to allow a portion of the parison to form around that portion of pin 50 extending beyond sleeve end 42, as is illustrated in FIG. 4. The above-mentioned delay time is preferably about 2–6 seconds. The particular delay time employed will depend upon such factors as the original parison wall thickness, the type of parison plastic, and the cooling capability of whatever cooling mechanism is used to cool mold part 10. channels (not shown) are typically defined within the mold part for receiving a flow of cooling water. Continuing to refer to FIG. 4, the hollow boss 60 that is formed has a closed end 62 which, although thinner than the original parison wall thickness, is sufficiently thick to avoid the previously discussed problems of penetration and/or cracking by a screw received within the boss of the resulting molded article.

An example will now be described to further illustrate the invention, but which should not be construed to limit the invention in any manner. A hollow plastic article with an inwardly projecting hollow boss was blow molded in several runs using an apparatus substantially like that shown in FIGS. 1 and 2.

Referring again to FIG. 1, sleeve 40 and pin 50 had diameters of ⅜ inch and ⅛ inch, respectively. Thus, the ratio of the sleeve diameter to the pin diameter was 3:1. Pin end 52 was longitudinally spaced 0.4 inch from end 16 of mold opening 14. In addition to mold part 10 receiving the sleeve and pin therethrough, a second mold part and conventional hydraulic equipment were provided to enable the two mold parts (i.e. mold "halves") to open and close with respect to one another. Conventional equipment for extruding a molten plastic parison and blowing air into the parison were also employed. The plastic parison had an original wall thickness of 0.2 inch.

In each inventive run, the following described procedure was followed. The sleeve is set in its extended position in the manner described previously. AS the parison drops from the extruder, a low pressure (25–40 psi) "preblow" stage starts only a few tenths of a second before the parison drops to its final position. The preblow is for the purpose of maintaining the parison in its desired uniform and cylindrical shape. The time at which the parison reaches its final position between the open mold parts is considered in this description as being at 0 seconds. At 0.5 seconds, the preblow stage ends. During the entire preblow stage, the mold parts are closing by means of the above-mentioned hydraulic equipment. At 1.5 seconds, the mold parts close and the high pressure (80–90 psi) blow begins. This time is considered to be the time at which blow molding is initiated. within less than about 0.2 seconds, the parison fully expands within the closed mold parts. At a predetermined delay time (discussed further below) after initiation of blow molding, the sleeve is retracted to its retracted position. At about 60–70 seconds, the pressure in the closed mold parts is relieved and the mold parts begin to open. No cooling period is required before the mold parts are opened, because the mold parts are continuously cooled during blow molding by means of channels defined therein for receiving a flow of cooling water. After the mold parts are opened, the molded article drops out of the mold parts onto a cooling bed. In this case, the molded article is a tank for containing water, which has an inwardly projecting hollow boss with a closed end.

The following table sets forth the results of seven runs. Run 1 was a control run in which the above described procedure was followed, except that the sleeve was kept in its retracted position throughout blow molding. In inventive runs 2–7, the sleeve was retracted from its extended position to its retracted position at different delay times after initiation of blow molding.

| Run | Delay Time (secs.) | Boss end thickness (in.) |
|---|---|---|
| 1 | N/A | 0.037 |
| 2 | 1.0 | 0.048 |
| 3 | 2.0 | 0.084 |
| 4 | 2.5 | 0.095 |
| 5 | 3.0 | 0.099 |
| 6 | 3.5 | 0.117 |
| 7 | 4.0 | 0.125 |

Control run 1 resulted in an undesirably thin boss end, lending itself to structural weakness and penetration and/or cracking when a screw is threadedly received in the hollow boss. The delay time of 1.0 second in run 2 resulted in a small increase in boss end thickness. However, the delay times in runs 3–7 resulted in dramatic increases in boss end thickness as compared to control run 1, thereby greatly decreasing or eliminating the possibility of penetration or cracking.

Obviously, many modifications and variations of the present invention are possible in light of the above teachings. For example, instead of having the sleeve end flush with the mold face as in the retracted position of the illustrated embodiment, the sleeve end could be positioned inside the mold opening to form an outwardly projecting boss of larger diameter than the inwardly projecting boss. Or, the sleeve end could be positioned outside of the mold opening to form an inwardly projecting boss with an enlarged "countersunk" outer portion. According to another possible variation, a reciprocable pin could be fixed in position relative to the mold part as previously described during blow molding, but thereafter retracted so as to not interfere with removal of the molded article from the mold part. It is, therefore, to be understood that within the scope of the appended claims, the invention can be practiced otherwise than as specifically described.

That which is claimed is:

1. A blow molding apparatus comprising:

a mold part having a mold face, wherein the mold face contacts and defines an outer surface of an article formed by blow molding, and an opening extending through the mold part which is hereafter denoted as a mold opening, the mold opening having an end at the mold face;

a sleeve having an end and slidably received in the mold opening;

a pin having an end and extending through the sleeve, which thereby fits over and around the pin;

a means for fixedly positioning the pin relative to the mold part so that the pin extends beyond the mold opening end with the pin end spaced therefrom outside of the mold opening; and a reciprocation means for selectively reciprocating the sleeve between an extended position and a retracted position, where in the extended position the sleeve end is substantially flush with the pin end and in the retracted position the pin extends beyond the sleeve end with the pin end spaced therefrom outside of the sleeve.

2. An apparatus as recited in claim 1 where in the retracted position the sleeve end is substantially flush with the mold face.

3. An apparatus as recited in claim 1 wherein the reciprocation means comprises:

a cylinder fixedly connected to the mold part;

a piston slidably received in the cylinder and fixedly connected to the sleeve;

and a fluidic means for selectively moving the piston, by application of fluid pressure thereto, between positions corresponding to the extended and retracted positions of the sleeve.

4. An apparatus as recited in claim 3 wherein the fluidic means is pneumatic so as to use air as the fluid.

5. An apparatus as recited in claim 1 wherein the means for fixedly positioning the pin fixedly connects the pin to the mold part.

6. An apparatus as recited in claim 5 wherein the aforementioned pin end is denoted as the first pin end and wherein the pin has an opposing second pin end, and further wherein the means for fixedly positioning the pin comprises:

a pin retaining bracket fixedly connected to the mold part;

and a connecting means for fixedly connecting a portion of the pin adjacent to the second pin end to the retaining bracket.

7. An apparatus as recited in claim 6 wherein the connecting means comprises at least one nut threadedly received on the portion of the pin adjacent to the second pin end.

8. An apparatus as recited in claim 1 wherein the pin and sleeve have outer surfaces which are circularly cylindrical.

9. An apparatus as recited in claim 8 wherein the ratio of the sleeve diameter to the pin diameter is about 2:1–4:1.

10. An apparatus as recited in claim 9 wherein said ratio is about 2.5:1–3.5:1.

* * * * *